United States Patent [19]

Goldsmith

[11] Patent Number: 5,108,601
[45] Date of Patent: * Apr. 28, 1992

[54] CROSS-FLOW FILTRATION DEVICE WITH FILTRATE CHAMBERS AND INTERNAL FILTRATE COLLECTION VOLUME

[75] Inventor: Robert L. Goldsmith, Belmont, Mass.

[73] Assignee: CeraMem Corporation, Waltham, Mass.

[*] Notice: The portion of the term of this patent subsequent to Apr. 23, 2008 has been disclaimed.

[21] Appl. No.: 416,428

[22] Filed: Oct. 3, 1989

Related U.S. Application Data

[63] Continuation-in-part of Ser. No. 254,280, Oct. 5, 1988, Pat. No. 5,009,781, which is a continuation-in-part of Ser. No. 033,572, Apr. 2, 1987, Pat. No. 4,781,131.

[51] Int. Cl.⁵ .............................................. B01D 61/08
[52] U.S. Cl. ............................. 210/247; 210/321.89; 210/496
[58] Field of Search ............... 210/247, 321.82, 321.89, 210/486, 456, 510.1, 496

[56] References Cited

U.S. PATENT DOCUMENTS

| | | | |
|---|---|---|---|
| 4,032,454 | 6/1977 | Hoover et al. | 210/490 X |
| 4,222,874 | 9/1980 | Connelly | 210/650 |
| 4,417,908 | 11/1983 | Pitcher, Jr. | 210/510.1 X |
| 4,781,831 | 11/1988 | Goldsmith | 210/321.82 X |
| 5,009,781 | 4/1991 | Goldsmith | 210/247 |

*Primary Examiner*—Frank Spear
*Attorney, Agent, or Firm*—Richard P. Crowley

[57] ABSTRACT

A cross-flow filtration device which receives a feed stock at a feed end face and separates the feed stock into filtrate and retentate, the device having a structure, preferably a monolith, formed of porous material and defining a number of passageways which extend longitudinally from the feed end face to a retentate end face of the structure. The structure further includes a number of longitudinal filtrate chambers and a filtrate collection volume extending into the structure and communicating with the filtrate chambers. The filtrate chambers are distributed among the passageways to provide low pressure drop flow paths for filtrate flow through the porous material from the passageways to nearby filtrate chambers, and at least some of the passageways are separated from filtrate chambers by intervening passageways, thereby enabling a high ratio of passageway surface area to volume of the device and a high rate of filtrate removal.

22 Claims, 3 Drawing Sheets

CROSS-FLOW FILTRATION DEVICE WITH FILTRATE CHAMBERS AND INTERNAL FILTRATE COLLECTION VOLUME

RELATED CASES

This application is a continuation-in-part of U.S. Ser. No. 254,280, filed Oct. 5, 1988, now U.S. Pat. No. 5,009,781, which is a continuation-in-part of U.S. Ser. No. 003,572, filed Apr. 2, 1987, now U.S. Pat. No. 4,781,831, "Improved Cross-Flow Filtration Device With Filtrate Flow Conduits And Method Of Forming Same", both of which are incorporated herein by reference.

FIELD OF INVENTION

This invention relates to an improved cross-flow filtration device for separating a feed stock into filtrate and retentate, and more particularly to such a device having filtrate chambers with low flow resistance which provide enhanced filtrate removal from the interior of the device to a filtrate collection volume which extends into the device. This invention also relates to an improved membrane device which employs such a cross flow filtration device as a membrane support.

BACKGROUND OF INVENTION

There is a multitude of filtration devices which separate a feed stock into filtrate and retained suspended matter which is too large to pass through the pore structure of the filter. A straight-through filter retains the suspended matter on the filter surface or within the filter matrix and passes only the filtrate. Cross flow filters operate with tangential flow across the filter surface to sweep away suspended matter unable to pass through the filter surface pores. Cross-flow filters provide for the continuous extraction of retentate, or concentrated suspended matter, from one portion of the device and continuous extraction of filtrate from another portion As is well known in the art, the filtration rate of cross-flow filters is generally limited by the resistance of a filter cake that builds up on the filter surface The thickness and corresponding resistance of this cake is controlled by the cross-flow velocity. This phenomenon of cake thickness controlled by concentration polarization of retained suspended matter is extensively described in the technical literature. In order to obtain the maximum filtration rate, cross flow filters are normally constructed from porous materials which have a low resistance to filtrate flow relative to that of the filter cake. That is, in operation the pressure drop across the porous filter itself is low relative to the pressure drop across the filter cake, and the resistance of the latter is determined by hydrodynamic flow conditions across the filter surface.

Cross-flow filters can be constructed using multiple-passageway, porous monoliths. Such monoliths can have tens to thousands of passageways extending through them, with the passageways normally parallel and uniformly spaced. When in use the feed stock is introduced under pressure at one end of the monolith, flows in parallel through the passageways, and is withdrawn as retentate at the downstream end of the device.

Filtrate which passes into the porous monolith walls separating the passageways combines and flows though the walls toward the periphery of the monolith, and is removed through an integral, pressure-containing outer skin of the monolith. The resistance to flow in the tortuous flow path of the monolith passageway walls can severely limit filtration capacity, and for this reason cross-flow filters based on large diameter, high surface area, multiple passageway, porous monoliths are not found in commercial use.

Membrane devices utilize a semipermeable membrane to separate filtrate, also called permeate, from retentate. There is a multitude of different pressure driven membrane devices which separate and concentrate particles, colloids, macromolecules, and low molecular weight molecules. Membranes generally require a mechanical support which can be integral with the membrane, or separate For example, membranes can be coated onto, or simply mechanically supported by, a porous support material.

Multiple-passageway, porous monoliths can be especially useful as membrane supports In this instance membranes are applied to the passageway walls, which serve both as a mechanical support and as the flow path for filtrate removal to a filtrate collection zone. A high flow resistance of the passageway walls of the monolith can be troublesome first in that it can prevent adequate formation of membranes, for example, by dynamic formation procedures. Second, if membranes are otherwise applied to the monolith passageway walls, the resistance of the passageway walls to filtrate flow can limit device capacity This limitation has clearly been recognized by developers of such devices, for example, by Hoover and Roberts in U.S. Pat. No. 4,069,157. That patent teaches a solution to such limitation by limiting a number of parameters to values within specific ranges. The surface area of the passageways per unit volume, the porosity of the support, and the proportion of the volume of the support material exclusive of the passageways to the total volume of the support are defined within certain ranges, and are combined to define an allowable range of a permeability factor for the support.

Other monolith based membrane devices have been developed in the United States, France, and The People's Republic of China. For these devices practitioners also have recognized a support permeability limitation and have generally overcome this limitation by use of monoliths with a combination of small overall diameter, relatively few feed passageways and large pore size of the support material. Several commercially available membrane devices utilize a number of small diameter monoliths, each with up to 19 passageways, distributed within a cylindrical housing. Filtrate exits from the sides of each monolith and mixes with the filtrate from the other monoliths, after which it is collected The overall packing density, or membrane area per unit volume, of these devices is quite low.

The monoliths used by all the above sources as supports for membrane devices have had the common characteristic of employing passageways which are substantially uniformly spaced throughout the support. Given this constraint, product developers have worked with variables such as those detailed by Hoover and Roberts in the above referenced patent to avoid filtrate flow path limitations.

Thus the flow resistance of the passageway walls of porous monoliths can be a limiting factor in the use of monoliths either as cross-flow filtration devices or as membrane supports in membrane devices. Further, this limitation becomes increasingly severe as the packing density, or effective filter or membrane area per unit volume, of the device increases.

Other developers of monolith based devices have used means of filtrate removal other than along the sides of the monolith device. One category of such filtration devices is a balanced pressure system. In this device one or more of the passageways is used to remove filtrate in a longitudinal manner rather than in the radial manner of Hoover and Roberts cited above. Such devices include those of Ellenburg in U.S. Pat. No. 3,712,473, Hoover and Roberts in U.S. Pat. No. 4,032,454, and Connelly in U.S. Pat. NO. 4,222,874. For these devices a primary reason for selecting this mode of filtrate removal is to be able to pressurize the monolith exterior surface with feed material in order to keep the monolith under a compressive force, thereby minimizing the potential of monolith mechanical failure. Connelly further teaches the use of radial filtrate ducts to reduce resistance to filtrate radial flow within a large diameter monolith to a central longitudinal filtrate duct. Such radial filtrate ducts pass through the porous monolith material and do not intersect any of the longitudinal passageways. This arrangement of radial filtrate ducts is such that it is physically difficult to utilize monoliths of high packing density, and the devices of Connelly have packing densities of below about 100 square feet of feed passageway area per cubic foot of monolith structure.

Yet other developers of monolith based devices have provided modifications to accomplish multiple flow path bodies. For example, in the heat exchange devices of Kelm, U.S. Pat. Nos. 4,041,592 and 4,126,178, and Noll et al., U.S. Pat. No. 4,041,591 two fluids enter separately into a body, are maintained separately within the body, and exit separately. Thermal exchange occurs between the two fluids but there is no transfer of matter Kelm and Noll et al. state that a porous body can be used for filtration or osmosis processes, but no further teaching is provided.

Still other developers of monolith based devices have provided modifications to provide multiple flow path bodies. Charpin, U.S. Pat. No. 4,427,424 discloses such devices fabricated from fine pored gas separation membranes. Schnedecker, U.S. Pat. Nos. 4,338,273, 4,426,762 and 4,518,635 describes processes for fabricating such devices useful for heat exchange and ultrafiltration.

The devices of Kelm, Noll, Charpin and Schnedecker when considered for filtration or membrane devices all have the characteristic that the transport of matter is considered to occur primarily from high pressure feed passageways through adjoining walls directly into low pressure filtrate passageways. Accordingly, the devices disclosed have each feed passageway adjacent to a filtrate passageway.

SUMMARY OF INVENTION

It is therefore an object of this invention to provide an improved cross flow filtration device which readily removes filtrate from the device by extending a filtrate collection volume into the device.

It is a further object of this invention to provide such a cross flow filtration device which has a large amount of surface area of its passageways relative to the volume of the device.

It is a further object of this invention to provide such a cross flow filtration device which effectively utilizes substantially all of its passageways by providing a low pressure drop flow path for filtrate between even the innermost passageways and an external filtrate collection zone associated with the device.

It is a further object of this invention to provide such a cross-flow filtration device which enables the walls of the passageways to have smaller pore sizes while still providing adequate filtrate removal rates.

Yet another object of this invention is to provide an improved membrane support for use in a monolithic membrane device in which membranes are supported on the surfaces of its passageways.

This invention results from the realization that truly effective filtrate removal for a cross-flow filtration device or a membrane device using a porous monolith having multiple passageways can be achieved by constructing a filtrate network having a number of filtrate chambers distributed among the monolith passageways to ensure a favorable pressure drop from any passageway wall to a nearby chamber. The chambers in turn communicate with a filtrate collection volume extending into the monolith to carry the filtrate toward a filtrate collection zone. At least some of the passageways are separated from filtrate chambers by intervening passageways.

This invention features a cross-flow filtration device which receives a feed stock at a feed end face and separates the feed stock into filtrate and retentate. The device includes a structure of porous material which defines a plurality of passageways extending longitudinally from the feed end face to a retentate end face of the structure through which the feed stock flows to pass retentate from the device. The device further includes a plurality of longitudinal filtrate chambers which communicate with a filtrate collection volume extending into the structure to discharge filtrate from the structure. The filtrate chambers are distributed among the passageways to provide low pressure drop flow paths for filtrate flow through the porous material from the passageways to nearby filtrate chambers, and some of the passageways are separated from filtrate chambers by intervening passageways.

In one embodiment, the structure is a single monolith and the filtrate chambers and filtrate collection volume are formed within the monolith. The filtrate collection volume may be established internal to the monolith by a slot formed in one end face of the monolith, the slot being sealed at that end face and at the exterior surface of the monolith to isolate the slot from the feed stock and the retentate. Alternatively, the filtrate collection volume includes a hole formed in the monolith which is sealed at the exterior surface of the monolith. The slot and the hole communicate with one or more filtrate ducts to discharge filtrate from one or both end faces of the monolith, or with a filtrate collection zone disposed along at least one side of the monolith to discharge filtrate from that side.

The filtrate chambers preferably are formed from one or more rows of passageways which extend across the monolith and may be parallel to each other. At least some of the filtrate chambers are separated from an adjacent filtrate chamber by at least three passageways along a direction transverse to the passageways. The transverse direction in this construction is perpendicular to the direction of the rows. Further, substantially each filtrate chamber may be separated along the transverse direction from an adjacent filtrate chamber by at least four passageways. In other words, two or more passageways are remote from any filtrate chamber along the transverse direction.

The monolith may be a ceramic material selected from cordierite, alumina, mullite silica, zirconia, titania, spinel, silicon carbide, or mixtures thereof. Permselective membranes, selected from the group of membranes suitable for cross flow microfiltration, ultrafiltration, reverse osmosis, gas separations, or pervaporation, may be applied to the surfaces of the passageways.

DISCLOSURE OF PREFERRED EMBODIMENT

Other objects, features and advantages will occur from the following description of a preferred embodiment and the accompanying drawings, in which.

This invention may be accomplished by a cross flow filtration device formed of a multiple passageway structure, preferably monolith, a porous material having one or more filtrate networks distributed among and isolated from the monolith passageways which extend longitudinally from a feed end face to a retentate end face. The resulting cross-flow filtration device receives th feed stock at the feed end face and the walls of the passageways conduct the filtrate to the filtrate networks while passing the impermeable materials as retentate from a retentate end face. Each filtrate network provides paths of lower flow resistance than that of alternative flow paths through the porous material and provides a direct route for the filtrate to travel from the interior of the cross-flow filtration device to a filtrate collection volume which extends into the structure. The filtrate network according to this invention includes a plurality of longitudinal filtrate chambers isolated from both end faces of the monolith. In one construction, at least some of the chambers are separated from an adjacent filtrate chamber by at least three passageways along one or more directions transverse to the passageways. In another construction, the filtrate chambers are arranged in one or more longitudinal rows, and some of the passageways are separated from nearby filtrate chambers by one or more intervening passageways.

A device according to this invention is described as a cross flow filtration device from which filtrate and retentate are extracted, but it is to be recognized that the invention also relates to a porous monolith used as a support for a membrane device from which permeate and retentate are extracted. Hereinafter, the term cross flow filtration device encompasses a porous monolith support for a membrane device and the term filtrate encompasses permeate extracted from a membrane device. Such membranes can include separation barriers suitable for cross flow microfiltration, ultrafiltration, reverse osmosis, gas separations, and pervaporation.

The filtrate passes from the filtrate chambers to a filtrate collection volume which is described below as including one or more filtrate channels and one or more filtrate ducts. The filtrate channels and ducts are open spaces communicating with substantially all of the filtrate chambers to collect filtrate from the chambers. For the monoliths described below the filtrate then passes to an external filtrate collection zone at one or both ends of the monoliths. Alternatively, as described in U.S. Pat. No. 4,781,831, the filtrate collection zone is disposed along one or more sides of the monolith, and no filtrate duct is required. Both arrangements are encompassed in the present invention.

Figure 1:
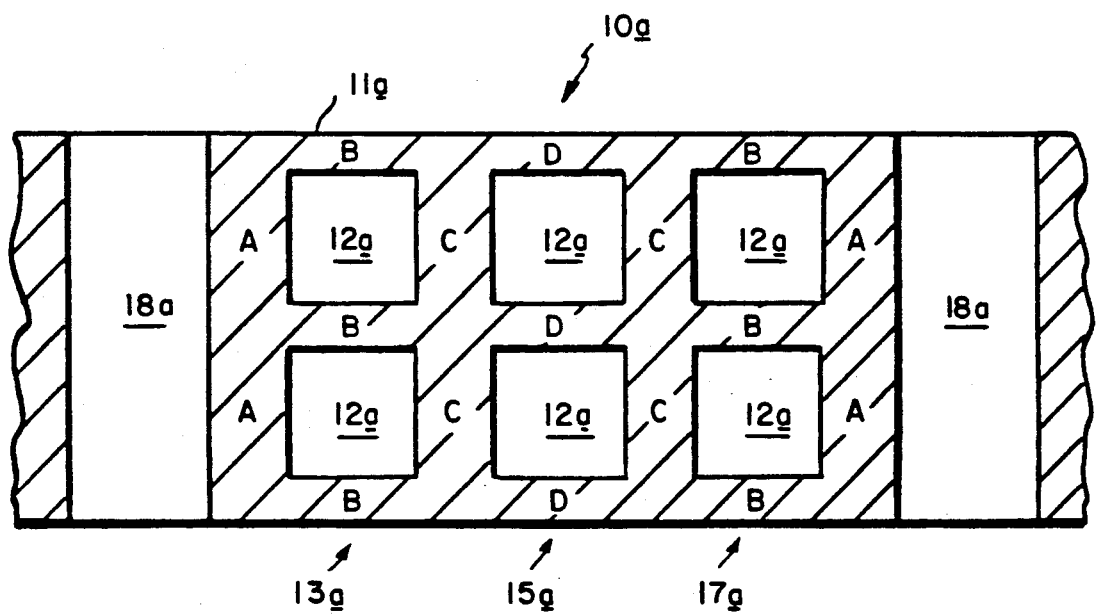
FIG. 1 is an enlarged cross-sectional view of a cross-flow filtration device according to the invention having filtrate chambers separated by three rows of passageways.

The operation of the cross flow filtration device according to the invention is best understood with reference to FIG. 1, an enlarged cross sectional view of a cross flow filtration device 10a with three rows 13a, 15a, 17a of passageways 12a located between two filtrate chambers 18a. The passageways 12a and the filtrate chambers 18a extend longitudinally into the plane of the drawing. The filtrate chambers 18a are shown as larger in cross-sectional area than the passageways 12a; alternatively, the filtrate chambers 18a are arranged as rows of conduits similar to rows 13a, 15a, 17a of passageways 12a. Feed stock passes through passageways 12a and filtrate passes into the porous walls of the monolith 11a and migrates into the two filtrate chambers 18a and then into a filtrate collection zone (not shown). As feed stock is first fed through the passageways 12a, filtrate will take the path of least resistance, which is through passageway walls A between the outermost passageways 12a in rows 13a, 17a and the filtrate chambers 18a. As such, most of the filtrate will pass through walls A, although some of the filtrate will pass through walls B. As the filtration process continues, a filter cake will build up along walls A, increasing the resistance for flow through walls A. As a result of the filter cake, the resistance through the monolith 11a from walls B (as well as walls C) to filtrate chambers 18a will diminish relative to the combined resistance through the filter cake on walls A and the short secton of the monolith walls between walls A and filtrate chambers 18a. Significant filtrate flow will therefore begin to pass through walls B. A filter cake will subsequently build up on walls B, increasing the flow through walls C. At some time, a substantial filter cake will be built up along all four walls of the feed passageways 12a in rows 13a and 17a. The resistance to flow through this filter cake will be high relative to the resistance to flow through the porous monolith 11a. Accordingly, the resistance for the longer flow path from walls C to the filtrate chambers 18a, which is very high compared to the resistance across walls A, becomes comparable to the combined resistance across walls A and the filter cake which has built up on wall A. Once a significant filter cake has built up on all the walls A through C, there will be effective filtration through all the walls A through C. This increases the effective (active) filter surface area of the cross-flow filter.

A similar analysis can be made with respect to the center row 15a of passageways 12a separated from the filtrate chambers 18a by rows 13a, 17a of intervening passageways 12a. Once a filter cake of high resistance has formed on the walls of passageways 12a adjacent to filtrate chambers 18a, filtrate is effectively removed from row 15a of center passageways 12a, first through walls C, and eventually through walls D. A similar analysis applies for devices according to the invention having four or more rows of passageways. In cross flow filtration devices with passageways even more removed from filtrate chambers 14, feed passageways become progressively coated with a filter cake until concentration polarization determines filtration rate.

Prior art devices either lack filtrate conduits (because it was not recognized that the interior passageways were ineffective without filtrate chambers) or provide a filtrate conduit adjacent to at least one wall of each feed passageway. The first category of devices operate inefficiently because the overall flow resistance to filtrate is too great. The second category of devices are inefficient because they have fewer passageways and a low ratio cf passageway surface area to volume of the devices.

The present invention recognizes that the flow resistance through the filter cakes on passageway walls can be much greater than the flow resistance through the porous walls 10a, and that substantial filtrate can flow through the monolith walls from interior passageways since the resistance of the relatively long path of travel through the porous monolith from the interior passageways can be equivalent to or less than that of the filter cake on the walls A adjacent to the filtrate chambers. By this recognition, a structure is provided wherein three or more passageways (and therefore greater density of filtering surface area) can be provided between adjacent filtrate chambers. This recognition, together with the provision of the interspersed filtrate chambers 18a make it possible to provide a cross-flow filtration device having at the same time a high density of passageways (filtering surfaces) and a high rate of filtrate removal from that those surfaces.

In the description above, the invention is used as a cross-flow filtration device and the increased resistance at the walls of passageways is created by a filter cake. When the invention is used as a support for a permselective membrane, the membrane applied to the passageways walls itself creates an added resistance to filtrate flow. This membrane creates a redistribution of filtrate flow entirely analogous to that created by a filter cake. If the membrane coating has relatively low resistance, a filter cake can further build up on the membrane surface, especially at walls A of passageways 12a adjacent to filtrate chambers 18a. If a high resistance membrane is coated onto passageways walls, it is possible to obtain filtrate flow from passageways well removed from any filtrate chambers without a buildup of filter cake in the passageways adjacent to filtrate chambers.

In practice, an optimum selection of the number of passageways between filtrate chambers is obtained when substantially all passageways, even those most remote from a filtrate chambers, are active in separation. This is determined by a permeability characteristics of the porous material, the permeability characteristics of the filter cake, the permeability of the membrane coating (if present), and the device operating conditions (cross-flow velocity, pressure, temperature, and concentration level of matter retained by the device).

Figure 2:
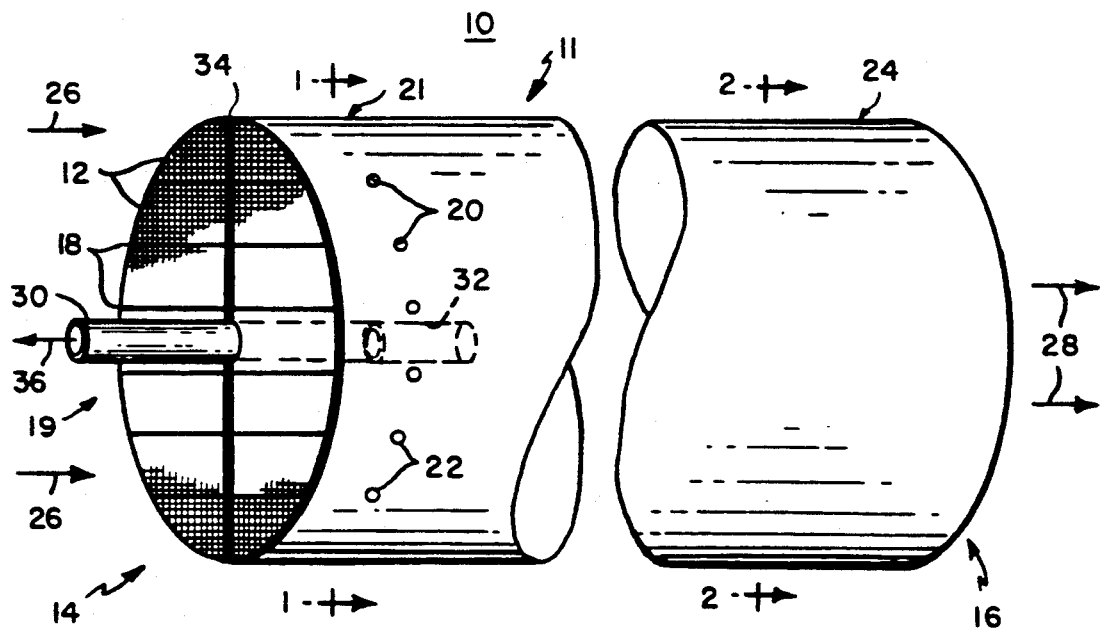
FIG. 2 is a schematic axonometric view of a cross flow filtration device according to this invention formed from a conventional monolith.

Cross flow filtration device 10, FIG. 2, is a cylindrical, multiple passageway monolith with longitudinal passageways which are square in cross-section Most of passageways 12 are open at each end face, and in use feed stock 26 enters these passageways at feed end face 14, flows through passageways 12, and exits monolith 11 as retentate 28 at retentate end face 16. Rows of passageways 18, 34 extending across monolith 11 are sealed at both end faces. These sealed passageways thereby become longitudinal filtrate chambers 18 which are part of filtrate network 19. Network 19 also includes filtrate channels 20 and a filtrate duct 32, which can also be viewed as extensions of a filtrate collection zone into the monolith 11. The open network elements 20 and 32 are hereinafter referred to as portions of a filtrate collection volume. The filtrate collection volume is established internally by channel 20 and duct 32, and externally by a filtrate collection zone (not shown).

Non longitudinal filtrate channels 20 transect the longitudinal filtrate chambers 18 and therefore extend transversely to the passageways 12. Filtrate channel 21, one of filtrate channels 20, transects chambers 34. These filtrate channels can be formed in a conventional monolith by drilling holes across the monolith through the filtrate chambers. All filtrate channels 20 are sealed by plugs 22 at the exterior surface 24 of monolith 11 to isolate them from the zone external to monolith 11. The exterior surface of monolith 11 can either be used as part of the filtration surface or can itself be sealed with an impervious coating.

The cross flow filtration device contains at least one longitudinal filtrate duct 32 at one or both of end faces 14, 16. Filtrate duct 32 may be formed in the monolith during fabrication, for example by extrusion, and can be an enlarged passageway which extends from one end face to the opposite end face of the monolith. Filtrate duct 32 is preferably larger than the other passageways to minimize filtrate pressure drop for filtrate removal and also to facilitate insertion of an impervious filtrate discharge tube 30. Alternatively, filtrate duct 32 can be an enlarged passageway formed by drilling from end to end of a conventional monolith, or only for a short distance into the monolith. In the latter case, the passageways opening into filtrate duct 32 become filtrate chambers if they are adjacent to any open passageways 12; passageways opening into filtrate duct 32 which are not adjacent to passageways 12 become unused.

Filtrate discharge tube 30 can be made from the same material as the monolith or a different material. Filtrate discharge tube 30 is used to withdraw filtrate 36 from the monolith to the external filtrate collection zone. The filtrate duct and filtrate discharge tube sealed therein can be incorporated at either or both end faces of the monolith. Filtrate discharge tubes in both ends faces are used when it is desired to utilize multiple monoliths in series flow within a single housing structure, and it is necessary to interconnect filtrate discharge tubes to allow filtrate withdrawal from monoliths not positioned next to an end cap of the housing. In this instance, interconnecting couplings join adjacent monolith filtrate discharge tubes to provide for leak free withdrawal of filtrate to the filtrate collection zone.

At least one filtrate channel 20 intersects with filtrate duct 32. This intersection occurs at a point in the filtrate duct not obstructed by the impervious filtrate discharge tube. In FIG. 1, filtrate channel 21 transects the rows of longitudinal filtrate chambers 34, is on a diameter of monolith 11 and is perpendicular to the plurality of other filtrate channels 20 which it intersects, thereby connecting all filtrate channels 20 to filtrate duct 32.

Sealing material used to seal passageways at the end faces 14 and 16 of monolith 11 to make filtrate chambers 18, to seal filtrate channels 22 at exterior surface 24 of the monolith 11, and to seal filtrate discharge tube 30 into filtrate duct 32 can be of the same or a different material as the monolith itself. Passageways at end faces 14 and 16 can be readily sealed to make filtrate chambers after masking the openings of passageways 12 and applying the sealant material.

Figure 3:
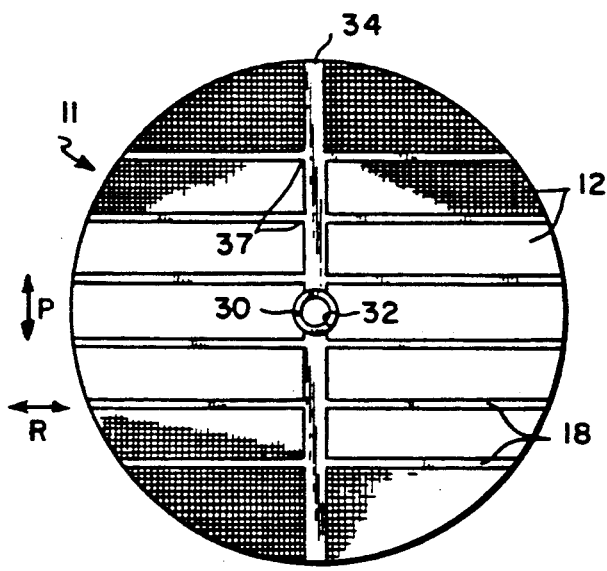
FIG. 3 is an end view of the cross flow filtration device shown in FIG. 2.

An end view of cross-flow filtration device 10 is shown in FIG. 3. Passageways 12 are unobstructed. Rows of filtrate chambers 18 are sealed and isolated from the passageways. The filtrate discharge tube 30 is sealed into filtrate duct 32. At least one row 34 of filtrate chambers 18 is aligned with filtrate duct 32 and accordingly filtrate discharge tube 30. Row 34 in turn intersects all other rows of filtrate chambers 18 at junctions 37.

In cross flow filtration device 10 according to this invention, each of the filtrate chambers is separated from an adjacent filtrate chamber by at least three passageways along all non longitudinal directions except parallel to the direction of the rows, illustrated by arrow R. The chambers are adjacent to each other along direction R, except for the chambers of row 34. Along direction P, which runs perpendicular to direction R, the chambers (except for those in row 34) are separated from adjacent chambers by nine passageways in this construction.

In other words, some of the passageways are separated from the rows of filtrate chambers by intervening passageways. In FIG. 3, nine rows of longitudinal passageways are present between each two rows of longitudinal filtrate chambers. In this construction, seven rows of passageways are separated from the two rows of filtrate chambers by each of two rows of passageways adjacent to the rows of filtrate chambers.

Figure 4:
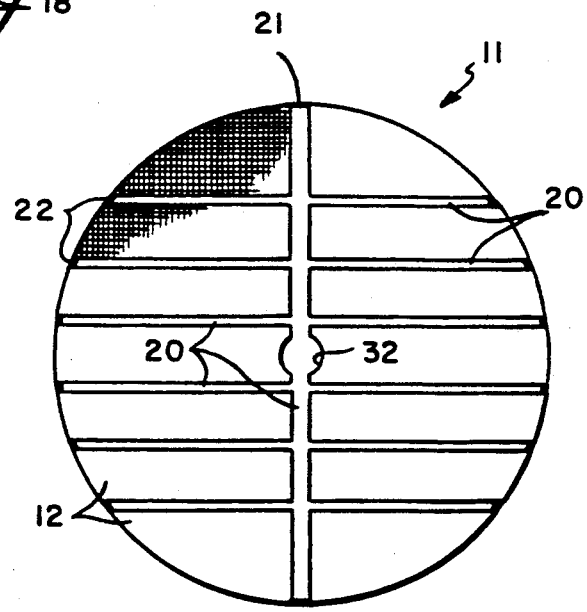
FIG. 4 is a cross sectional view of the cross flow filtration device along lines 1—1 of FIG. 2.

A cross-sectional view of cross-flow filtration device 10 along lines 1—1, FIG. 2, passing through the plane of filtrate channels 20 and plugs 22, is shown in FIG. 4. In this plane the filtrate channels 20 are unobstructed by any passageway wall and filtrate can flow unimpeded within the interconnecting filtrate channel network. At least one of the filtrate channels 20, filtrate channel 21 in this construction, intersects filtrate duct 32. This construction allows complete communication of all filtrate channels 20 with filtrate duct 32. Not shown in FIG. 4 are the open ends of longitudinal filtrate chambers 18 which open into the filtrate channels.

Figure 5:
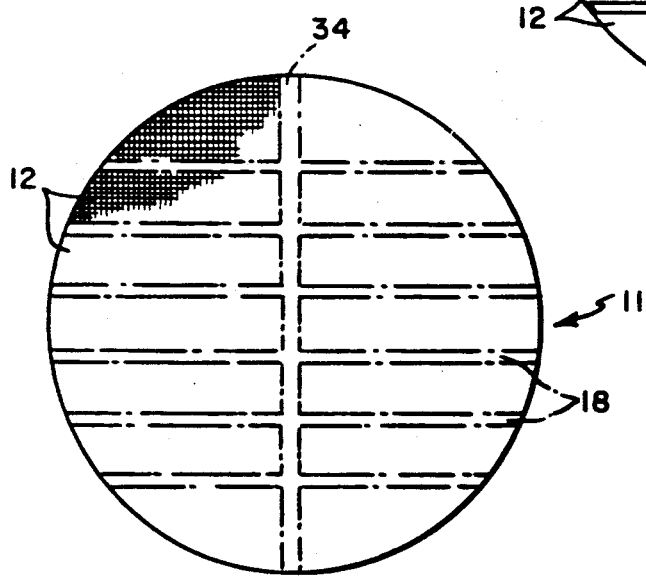
FIG. 5 is a cross-sectional view of the cross flow filtration device along lines 2—2 of FIG. 2.

A cross sectional view of cross-flow filtration device 10 along line 2—2, not in the plane of the filtrate channels, is shown in FIG. 5. In this cross-sectional view, all passageways 12 and filtrate chambers 18 are open and are indistinguishable one from another. Filtrate chambers 18, 34 are shown in phantom solely for purposes of illustration to indicate their location in this view.

In operation, referring to FIG. 2, filtrate from one of passageways 12 flows through passageway walls until it arrives at one of longitudinal filtrate chambers 18. Because the filtrate chambers extend essentially the entire length of the cross flow filtration device, a short path length for filtrate flow through passageway walls to a filtrate chamber is assured for filtrate from all passageways. Upon attaining a filtrate chamber the filtrate flows longitudinally toward a filtrate channel. The filtrate channel transects only filtrate chambers, not feed passageways, and the filtrate channel carries the filtrate flow primarily in a non longitudinal direction. The cross flow filtration device of FIG. 2 contains a plurality of rows of filtrate chambers, each row transected by a filtrate channel. The filtrate channels in turn communicate with a filtrate duct.

This combination of rows of filtrate chambers, each row transected by a filtrate channel, and each filtrate channel communicating with at least one filtrate duct allows a short flow path length for filtrate flow from each passageway through the passageway walls to the external filtrate collection zone. The filtrate flow path is comprised of a plurality of longitudinal filtrate chambers, transected by at least one substantially non longitudinal filtrate channel, which communicates with at least one longitudinal filtrate duct.

Figure 6:
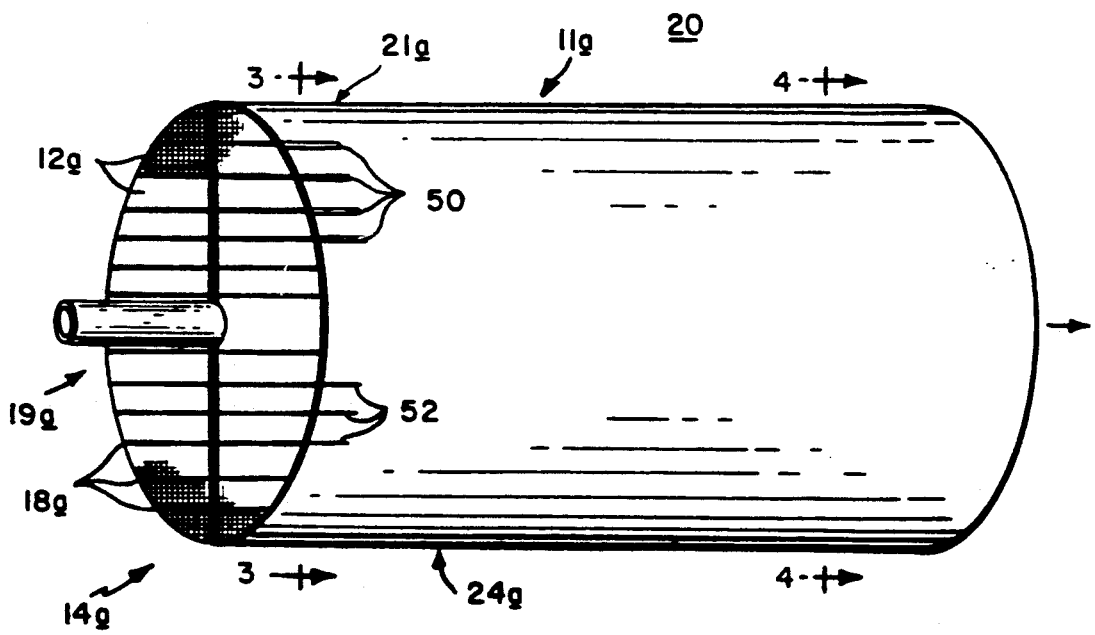
FIG. 6 is a schematic axonometric view of yet another cross-flow filtration device according to this invention formed from a conventional monolith.

Device 20, FIG. 6, is another embodiment of a cross-flow filtration device according to this invention with an alternative configuration of the filtrate channels. Network 19a is established by a plurality of rows of filtrate chambers 18a, channels 20a and duct 32a formed among passageways 12a. In this embodiment filtrate channels are made by forming slots 50 in at least one end face of the monolith. These slots are sealed with plugs 52 at end face 14a and at skin 24a of monolith 11a. Passageways opening into the slots 50 are sealed at the opposite end face of monolith 16 to form filtrate chambers. At least one filtrate channel 21a communicates with filtrate duct 32a. A cross-sectional view of monolith 11a at end face 14 corresponds to the view shown in FIG. 3; a cross sectional view along line 3—3 corresponds to the view shown in FIG. 4; and a cross-sectional view along line 4—4 corresponds to the view shown in FIG. 5. Slots 50 in the end of the monolith can be formed, for example, by sawing or machining. Slots can be formed and filtrate channels created in one or both ends of the monolith.

Cross flow filtration device 10 or 20 can be fabricated from a variety of porous materials, such as ceramics, plastics, or resin-impregnated solids such as sand. Among ceramics, it is desirable to use cordierite, alumina, mullite, silica, zirconia, titania, silicon carbide, spinel, or mixtures thereof.

While cylindrical monoliths are used in the above examples, it is to be recognized that other shapes such as square, rectangular or multisided may be employed. Also, passageway shapes other than square, such as round or triangular, and arrays other than square, such as hexagonally spaced, may be employed. Further, in the above examples essentially parallel rows of filtrate chambers are described, but it is to be recognized that alternative filtrate chamber configurations may be employed, such as rows aligned on the radii of a cylindrical monolith, rows not completely extending across the monolith device, or filtrate chambers arranged in a curved or other nonlinear pattern. Moreover, a number of independent filtrate networks can be established in a monolith.

Although specific features of the invention are shown in some drawings and not others, this is for convenience only as each feature may be combined with any or all of the other features in accordance with the invention.

Other embodiments will occur to those skilled in he art and are with the following claims:

What is claimed is:

1. A cross flow filtration device for receiving a feed stock at a feed end face and for separating the feed stock into filtrate and retentate, comprising:
   a monolith of porous material defining a plurality of passageways extending longitudinally from the feed end face to a retentate end face of the monolith through which the feed stock flows to pass retentate from the device, the surface area of the passageways being at least 100 square feet per cubic foot of monolith volume;
   a filtrate collection volume extending into the structure;
   a plurality of longitudinal filtrate chambers within the monolith communicating with and carrying filtrate to the filtrate collection volume, the filtrate chambers providing paths of lower flow resistance than alternative flow paths through the porous material; and the filtrate chambers being isolated from both end faces of the monolith and being distributed among the passageways to provide low pressure drop flow paths for filtrate flow through the porous material from the passageways to nearby filtrate chambers, and at least some of the passageways being separated from the filtrate chambers by intervening passageways.

2. The cross flow filtration device of claim 1 in which the filtrate collection volume includes at least one filtrate duct and at least one slot formed in an end face of the monolith, the slot being sealed at that end face and at the exterior surface of the monolith to isolate the slot from the feed stock and the retentate, and the slot communicating with the filtrate duct to discharge filtrate at the end face.

3. The cross-flow filtration device of claim 1 in which the filtrate collection volume includes at least one filtrate duct in an end face of the monolith and at least one hole formed in the monolith, the hole being sealed at the exterior surface of the monolith to isolate the hole from the feed stock and the retentate, and the hole communicating with the filtrate duct to discharge filtrate at the end face.

4. The cross flow filtration device of claim 1 in which the filtrate collection volume includes at least one slot formed in an end face of the monolith, the slot being sealed at that end face to isolate the slot from the feed stock and the retentate, and the slot communicating with a filtrate collection zone disposed along at least one side of the monolith to discharge filtrate to the filtrate collection zone.

5. The cross flow filtration device of claim 1 in which the filtrate collection volume includes at least one hole formed in the monolith, and the hole communicating with a filtrate collection zone disposed along at least one side of the monolith to discharge filtrate to the filtrate collection zone.

6. The cross flow filtration device of claim 1 in which the monolith porous material is a ceramic material.

7. The cross flow filtration device of claim 6 in which the ceramic material is selected from cordierite, alumina, mullite, silica, zirconia, titania, spinel, silicon carbide, or mixtures thereof.

8. A membrane device for receiving a feed stock at a feed end face and for separating the feed stock into filtrate and retentate, comprising:

a monolith of porous material defining a plurality of passageways extending longitudinally from the feed end face to a retentate end face of the monolith through which the feed stock flows to pass retentate from the device, the surface area of the passageways being at least 100 square feet per cubic foot of monolith volume;

a filtrate collection volume extending into the structure;

a plurality of longitudinal filtrate chambers within the monolith communicating with and carrying filtrate to the filtrate collection volume, the filtrate chambers providing paths of lower flow resistance than alternative flow paths through the porous material;

the filtrate chambers being isolated from both end faces of the monolith and being distributed among the passageways to provide low pressure drop flow paths for filtrate flow through the porous material from the passageways to nearby filtrate chambers; and a permselective membrane applied to the surfaces of the passageways.

9. The membrane device of claim 8 in which the filtrate collection volume includes at least one filtrate duct and at least one slot formed in an end face of the monolith, the slot being sealed at that end face and at the exterior surface of the monolith to isolate the slot from the feed stock and the retentate, and the slot communicating with the filtrate duct to discharge filtrate at the end face.

10. The membrane device of claim 8 in which the filtrate collection volume includes at least one filtrate duct in an end face of the monolith and at least one hole formed in the monolith, the hole being sealed at the exterior surface of the monolith to isolate the hole from the feed stock and retentate, and the hole communicating with the filtrate duct to discharge filtrate at the end face.

11. The membrane device of claim 8 in which the filtrate collection volume includes at least one slot formed in an end face of the monolith, the slot being sealed at that end face to isolate the slot from the feed stock and the retentate, and the slot communicating with a filtrate collection zone along at least one side of the monolith to discharge filtrate to the filtrate collection zone.

12. The membrane device of claim 8 in which the filtrate collection volume includes at least one hole formed in the monolith, and the hole communicating with a filtrate collection zone along at least one side of the monolith to discharge filtrate to the filtrate collection zone.

13. The membrane device of claim 8 in which the monolith porous material is a ceramic material.

14. The membrane device of claim 13 in which the ceramic material is selected from cordierite, alumina, mullite, silica, zirconia, titania, spinel, silicon carbide, or mixtures thereof.

15. The membrane device of claim 8 in which the permselective membrane is selected from the group of membranes suitable for cross flow filtration, ultrafiltration, reverse osmosis, gas separations, or pervaporation.

16. A cross-flow filtration device for receiving a feed stock at a feed end face and for separating the feed stock into filtrate and retentate, comprising:

a structure of porous material defining a plurality of passageways extending longitudinally from the feed end face to a retentate end face of the structure through which the feed stock flows to pass retentate from the device;

a filtrate collection volume extending into the structure;

a plurality of longitudinal filtrate chambers within the structure for carrying filtrate to the filtrate collection volume, the filtrate chambers providing paths of lower flow resistance than alternative flow paths through the porous material; and the filtrate chambers being isolated from both end faces of the structure and being distributed among the passageways to provide low pressure drop flow paths for filtrate flow through the porous material from the passageways to nearby filtrate chambers, and at least some of the filtrate chambers being separated from an adjacent filtrate chamber by at least three passageways along a direction transverse to the passageways.

17. The cross-flow filtration device of claim 16 in which the structure is a single monolith and the filtrate chambers and filtrate collection volume are formed within the monolith.

18. The cross-flow filtration device of claim 17 in which the filtrate chambers are formed from at least one row of passageways which extends across the monolith.

19. The cross flow filtration device of claim 17 in which the filtrate chambers are formed from a plurality of parallel rows of passageways, and the transverse direction is perpendicular to the direction of the rows.

20. The cross-flow filtration device of claim 17 further including a permselective membrane applied to the surfaces of the passageways.

21. The cross flow filtration device of claim 17 in which substantially each filtrate chamber is separated along the transverse direction from an adjacent filtrate chamber by at least four passageways.

22. The membrane device of claim 8 in which at least some of the passageways are separated from the filtrate chamber by intervening passageways.

* * * * *